United States Patent
Gagne et al.

(10) Patent No.: US 8,967,531 B2
(45) Date of Patent: Mar. 3, 2015

(54) AIRCRAFT AND AIRBORNE ELECTRICAL POWER AND THERMAL MANAGEMENT SYSTEM

(75) Inventors: Steven Gagne, Avon, IN (US); Rigoberto Rodriguez, Avon, IN (US); William L. Siegel, Woodbridge, VA (US); John R. Arvin, Panama City Beach, FL (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 0 days.

(21) Appl. No.: 13/432,842

(22) Filed: Mar. 28, 2012

(65) Prior Publication Data

US 2012/0248242 A1    Oct. 4, 2012

Related U.S. Application Data

(60) Provisional application No. 61/468,387, filed on Mar. 28, 2011.

(51) Int. Cl.
| | | |
|---|---|---|
| *B64D 41/00* | (2006.01) | |
| *B64D 13/00* | (2006.01) | |
| *B64D 13/08* | (2006.01) | |
| *F02C 7/32* | (2006.01) | |
| *B64D 13/06* | (2006.01) | |

(52) U.S. Cl.
CPC .............. *B64D 13/006* (2013.01); *B64D 13/08* (2013.01); *F02C 7/32* (2013.01); *B64D 2013/0614* (2013.01); *B64D 2013/0674* (2013.01)
USPC .......................................................... 244/58

(58) Field of Classification Search
USPC .................................................. 244/58, 53 R
See application file for complete search history.

(56) References Cited

U.S. PATENT DOCUMENTS

| | | | |
|---|---|---|---|
| 3,324,675 | A | 6/1967 | Mills |
| 4,399,665 | A | 8/1983 | Evans et al. |
| 4,706,908 | A | 11/1987 | Huffman et al. |
| 4,830,096 | A | 5/1989 | Biagini |

(Continued)

OTHER PUBLICATIONS

International Search Report and Written Opinion, PCT/US2012/030931, Rolls-Royce North American Technologies, Inc., Jun. 28, 2012.

(Continued)

*Primary Examiner* — Timothy D Collins
*Assistant Examiner* — Jessica Wong
(74) *Attorney, Agent, or Firm* — Krieg DeVault LLP

(57) ABSTRACT

A unique airborne electrical power and thermal management system and a unique aircraft having a unique airborne electrical power and thermal management system are provided. The electrical power and thermal management system includes a turbine, which may power loads, for example but not limited to, a generator and a refrigerant compressor. The turbine may be in fluid communication with a gas turbine engine bleed air source to extract power from bleed air for powering the loads. A combustor may be fluidly disposed between the bleed air source and the turbine. The turbine may be part of a gas turbine engine distinct from a propulsion gas turbine engine. In one aspect, at least a portion of the electrical power and thermal management system may be disposed within an aircraft external pod. The pod may be configured to appear similar to a conventional external fuel tank pod employed by the aircraft.

20 Claims, 5 Drawing Sheets

(56) References Cited

U.S. PATENT DOCUMENTS

| | | |
|---|---|---|
| 5,201,182 A | 4/1993 | Grignon et al. |
| 5,490,645 A | 2/1996 | Woodhouse |
| 5,667,168 A | 9/1997 | Fluegel |
| 5,899,085 A | 5/1999 | Williams |
| 6,568,633 B2 * | 5/2003 | Dunn .............................. 244/59 |
| 6,658,881 B1 | 12/2003 | Plattner |
| 6,663,044 B1 | 12/2003 | Munoz et al. |
| 6,948,331 B1 | 9/2005 | Ho |
| 7,246,658 B2 | 7/2007 | Wyatt et al. |
| 7,673,459 B2 | 3/2010 | Sheldon et al. |
| 7,721,554 B2 | 5/2010 | Balan et al. |
| 2003/0230671 A1 * | 12/2003 | Dunn .......................... 244/53 R |
| 2009/0302152 A1 | 12/2009 | Knight |
| 2010/0074736 A1 | 3/2010 | Junod |
| 2012/0160957 A1 * | 6/2012 | Gagne et al. .................... 244/54 |

OTHER PUBLICATIONS

Extended European Search Report, European Patent Application No. 12865093.4, Rolls-Royce North American Technologies, Inc., Sep. 30, 2014.

\* cited by examiner

AIRCRAFT AND AIRBORNE ELECTRICAL POWER AND THERMAL MANAGEMENT SYSTEM

CROSS REFERENCE

The present application claims the benefit of U.S. Provisional Patent Application No. 61/468,387, filed Mar. 28, 2011, which is incorporated herein by reference.

FIELD OF THE INVENTION

The present invention relates to aircraft, and more particularly, to an aircraft having an airborne electrical power and thermal management system.

BACKGROUND

Airborne systems that effectively provide electrical power and manage thermal energy remain an area of interest. Some existing systems have various shortcomings, drawbacks, and disadvantages relative to certain applications. Accordingly, there remains a need for further contributions in this area of technology.

SUMMARY

One embodiment of the present invention is a unique airborne electrical power and thermal management system. Another embodiment is a unique aircraft. Other embodiments include apparatuses, systems, devices, hardware, methods, and combinations for aircraft and electrical power and thermal management systems. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
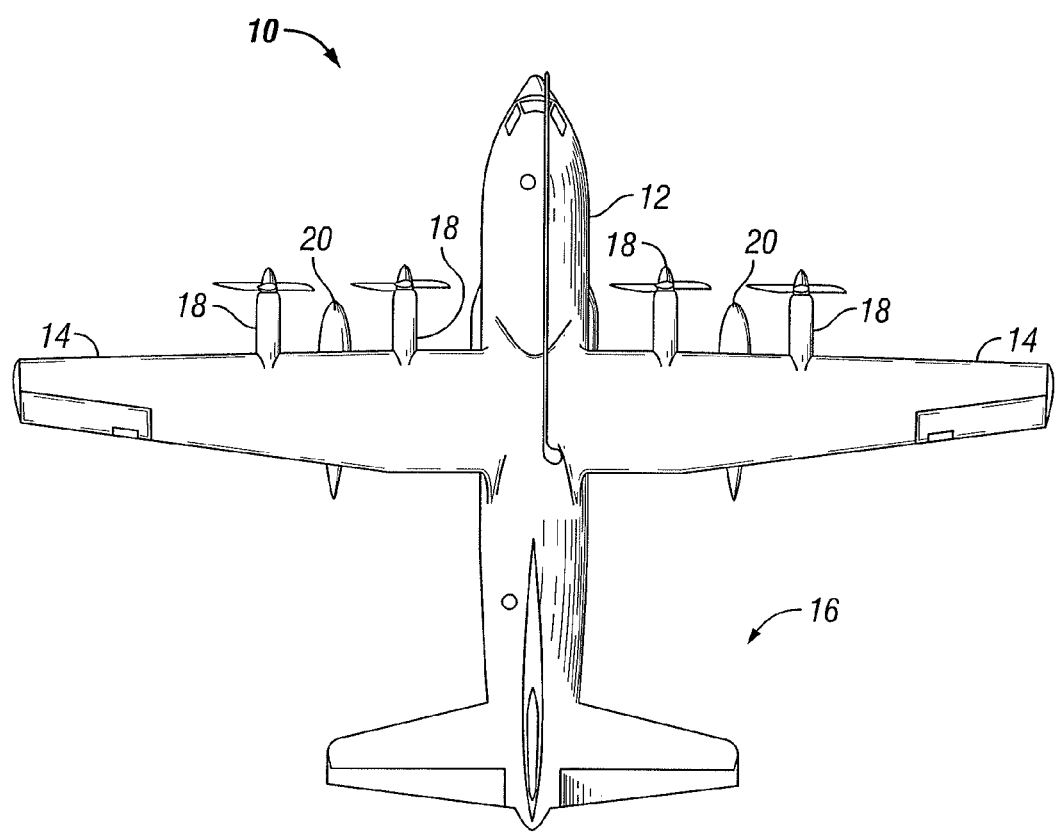
FIG. 1 illustrates an aircraft employed in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to FIG. 1, there are illustrated some aspects of a non-limiting example of an aircraft 10 employed in accordance with an embodiment of the present invention. Aircraft 10 includes a fuselage 12, wings 14, an empennage 16, four gas turbine engine propulsion systems 18 and two external pods 20. In one form, aircraft 10 is a multi-engine military turboprop aircraft. In other embodiments, aircraft 10 may be any fixed-wing aircraft, including turbofan aircraft, turbojet aircraft and turboprop aircraft. In still other embodiments, aircraft 10 may be a rotary-wing aircraft or a combination rotary-wing/fixed-wing aircraft. In various embodiments, aircraft 10 may have a single propulsion engine or a plurality of propulsion engines. In addition to propulsion engines, aircraft 10 may include one or more gas turbine auxiliary power units. In addition, in various embodiments, aircraft 10 may employ any number of wings 14. Empennage 16 may employ a single or multiple flight control surfaces.

Figure 2:
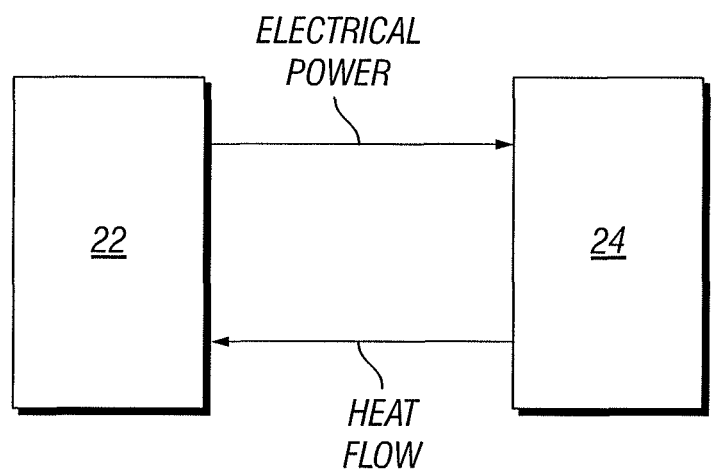
FIG. 2 schematically illustrates an electrical power and thermal management system operating to provide electrical power to and manage thermal energy for a system in accordance with an embodiment of the present invention.

Referring to FIG. 2, aircraft 10 includes an airborne electrical power and thermal management system 22, which is configured to provide electrical power and manage thermal loads for a system 24. In one form, system 24 is a directed energy weapon system, such as a high power laser system, a high power microwave system and/or a high power millimeter wave system. In other embodiments, system 24 may include other aircraft electrical and thermal loads. As illustrated in FIG. 2, in one form, system 22 is configured to provide electrical power to system 24, and to receive thermal energy from system 24, e.g., heat energy rejected by system 24. In various embodiments, system 22 is partially or completely disposed within an external pod 20, which, for example, may be retrofitted from use as an external fuel tank pod. In one form, external pod 20 is configured to appear similar to a conventional external fuel tank pod, e.g., in order to avoid altering of the appearance of aircraft 10 or to minimize any alteration of the appearance of aircraft 10 due to the inclusion of airborne electrical power and thermal management system 22 and/or system 24.

Figure 3:
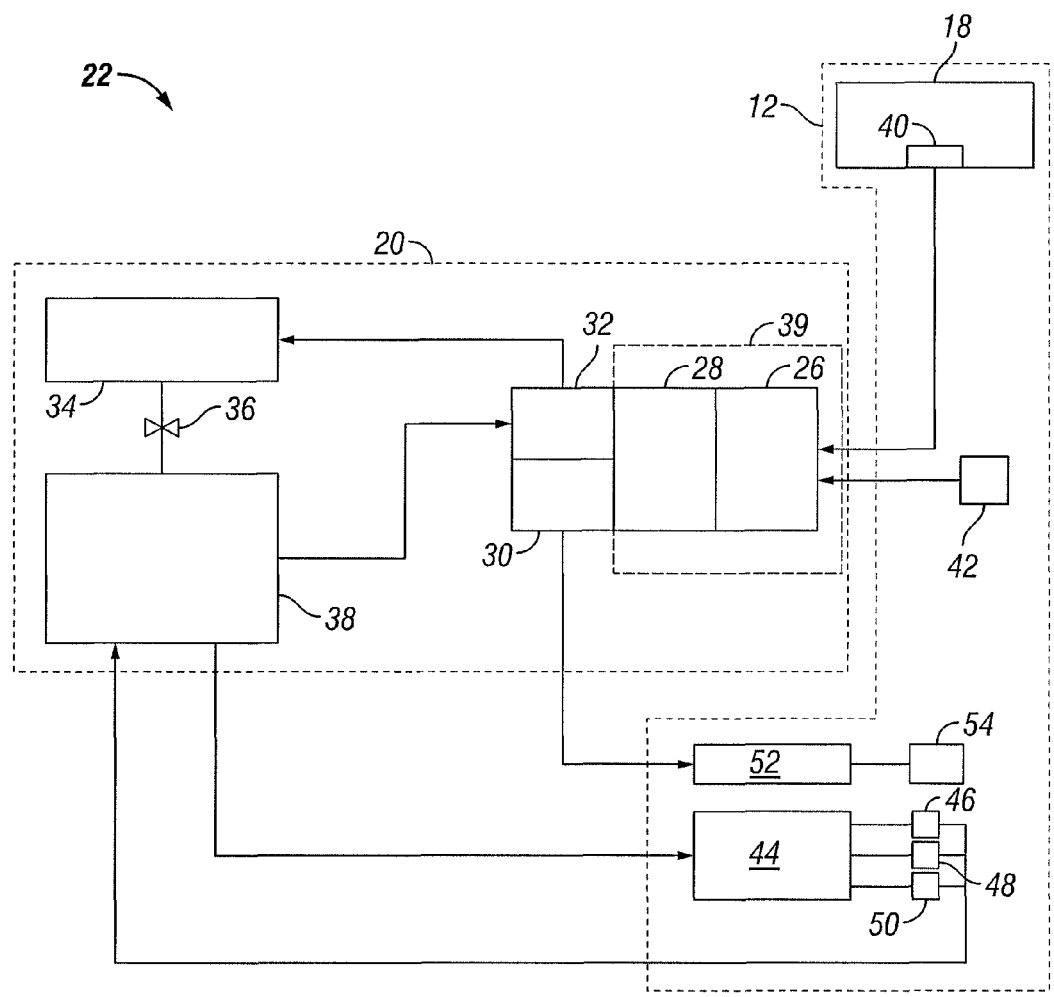
FIG. 3 schematically illustrates a non-limiting example of some aspects of an electrical power and thermal management system in accordance with an embodiment of the present invention.

Referring to FIG. 3, a non-limiting example of some aspects of an electrical power and thermal management system 22 in accordance with an embodiment of the present invention is schematically depicted. In one form, electrical power and thermal management system 22 includes a combustor 26, a turbine 28, a generator 30, a refrigerant compressor 32, a condenser 34, an expansion valve 36 and an evaporator 38 that is configured to chill a fluid, e.g., water. In some embodiments described herein, combustor 26 and turbine 28 (via combustor 26) are supplied with pressurized air from one or more gas turbine engine propulsion systems 18 in order to produce power to drive generator 30, refrigerant compressor 32 and/or other components. In some embodiments, electrical power and thermal management system 22 may include a complete gas turbine engine 39 disposed within pod 20, wherein engine 39 includes a compressor (not shown) in fluid communication with combustor 26, and turbine 28 in fluid communication with combustor 26. The compressor of engine 39 may be supplied with ambient air, e.g., ram air, for example, via one or more openings (not shown) in pod 20, and/or may be supplied with pressurized air from a bleed air port of one or more gas turbine engine propulsion systems 18, e.g., a compressor bleed port. Refrigerant compressor 32, condenser 34, expansion valve 36 and evaporator 38 are parts of a refrigeration system configured to handle the thermal loads of system 24, e.g., by extracting heat from one or more components of system 24.

In some embodiments, electrical power and thermal management system 22 may include one or more other cooling systems to handle the thermal loads of system 24 in addition to or in place of a refrigeration system. For example, a cooling fluid may be circulated through or in proximity to one or more system 24 components to absorb heat from the system 24 components. The cooling fluid may then be circulated through one or more heat exchangers, e.g., air cooled heat exchangers disposed within external pod 20, for removal of the heat from aircraft 10. Although many or all components of the refrigeration system and/or other cooling system (e.g., one or more heat exchangers) may be disposed within external pod 20, some such components may be located elsewhere in aircraft 10, i.e., not in external pod 20, including, for example and without limitation, one or more refrigerant and/or cooling fluid return pumps. Although components of electrical power and thermal management system 22 are depicted in certain locations and orientations within external pod 20 in FIG. 3 (and in FIGS. 4 and 5), it will be understood that in various embodiments, components of electrical power and thermal management system 22 and/or other components may be disposed in any desired locations and orientations within external pod 20.

In one form, combustor 26, turbine 28, generator 30, refrigerant compressor 32, condenser 34, expansion valve 36 and evaporator 38 are located within external pod 20. It will be understood that an electrical power and thermal management system 22 and/or components thereof may be mounted in each external pod 20, and that the output of both may be combined in order to meet electrical power and thermal management demands of aircraft 10 and/or any weapon system installed therein and/or mounted thereon. In some embodiments, one or more of combustor 26, turbine 28, generator 30, refrigerant compressor 32, condenser 34, expansion valve 36 and evaporator 38 may be mounted in other locations.

Combustor 26 is in fluid communication with turbine 28. During the operation of system 22, combustor 26 is supplied with pressurized air from a bleed port 40 of one or more gas turbine engine propulsion systems 18, e.g., a compressor bleed port. Combustor 26 includes one or more fuel injectors (not shown), which are supplied with fuel from a fuel tank 42, e.g., an aircraft 10 fuel tank. Combustor 26 is configured to mix the fuel with pressurized air received from bleed port 40 and to ignite the mixture using one or more igniters (not shown). Combustor 26 is configured to contain the combustion process, and to discharge the pressurized air, heated by the combustion process, into turbine 28. Turbine 28 is coupled to both generator 30 and refrigerant compressor 32, and is operative to power both generator 30 and refrigerant compressor 32 by extracting energy from the hot gases discharged from combustor 26. In one form, generator 30 and refrigerant compressor 32 operate at the same rotational speed as turbine 28. In other embodiments, one or more gearboxes may be interposed between turbine 28 and generator 30 and/or refrigerant compressor 32 to drive generator 30 and/or refrigerant compressor 32 at a different speed of rotation than turbine 28.

Condenser 34 is fluidly coupled to the output of refrigerant compressor 32. Condenser 34 is operative to condense the refrigerant discharged by refrigerant compressor 32 during the operation of turbine 28. In one form, ambient air, e.g., including ram air, is used as a coolant for extracting heat from condenser 34. In one form, an inlet scoop (not shown), e.g., a ram scoop (not shown) is employed to provide ambient air, e.g., ram air, for extracting heat from condenser 34. In other embodiments, air and/or one or more other fluids may be employed to extract heat from condenser 34 via one or more other means. Expansion valve 36 is fluidly coupled to the outlet of condenser 34, and is configured to expand the liquid refrigerant received from condenser 34, e.g., adiabatic expansion, which reduces the temperature of the liquid refrigerant. In other embodiments, other means may be employed in addition to or in place of expansion valve 36 to expand the liquid refrigerant received from condenser 34.

Evaporator 38 is in fluid communication with condenser 34 via expansion valve 36. In particular, the refrigerant inlet of evaporator 38 is fluidly coupled to expansion valve 36, and is operative to receive the refrigerant from expansion valve 36. The refrigerant outlet of evaporator 38 is fluidly coupled to the inlet of refrigerant compressor 32, and returns refrigerant vapor to the inlet of refrigerant compressor 32. Evaporator 38 is configured to chill fluid for delivery to a fuselage 12 mounted chilled fluid manifold 44. The chilled fluid outlet of evaporator 38 is in fluid communication with chilled fluid manifold 44. A recirculation pump (not shown) circulates a fluid, e.g., water and/or one or more other suitable fluids through evaporator 38 and chilled fluid manifold 44, transmitting heat in the fluid from chilled fluid manifold 44 to evaporator 38. Chilled fluid manifold 44 is in fluid communication with a plurality of heat sources 46, 48 and 50, and is configured to distribute chilled fluid to heat sources 46, 48 and 50. Heat sources 46, 48 and 50 may be, for example and without limitation, system 24 components, such as a high power microwave module, a modulator and an antenna module. In other embodiments, other components of aircraft systems, weapon systems, propulsion systems and system 22 may be cooled using the fluid chilled by evaporator 38, in addition to or in place of those heat sources mentioned herein. The fluid outlets of heat sources 46, 48 and 50 are in fluid communication with evaporator 38. Chilled fluid from chilled fluid manifold 44 is employed to extract heat from heat sources 46, 48 and 50 to cool those components. The fluid heated by heat sources 46, 48 and 50 is then circulated through and re-chilled by evaporator 38.

Generator 30 is electrically coupled to one or more power conditioning units 52, e.g., located in fuselage 12, for providing power in a desired form for one or more electrically powered devices 54, only one of which is illustrated for the sake of clarity. Conditioning unit 52 may be, for example and without limitation, a DC/DC converter or any signal conditioning or power converting component. Device 54 may be, for example and without limitation, a component of system 24, such as a gyrotron or a cathode heater, high power microwave module, a modulator and/or an antenna module or other directed energy weapon system component, or may be any electrical component. In some embodiments, electrical power and thermal management system 22 may include systems for storing energy and/or generating electrical power, in addition to or in place of generator 30, in order to supply power to one or more devices 54. For example and without limitation, one or more batteries (not shown) and/or flywheel/motor/generator systems (not shown) and/or fuel cell systems may be employed to provide and/or store energy for use by one or more devices 54, e.g., to handle peak loads and/or to provide electrical power to one or more devices 54 during startup of electrical power and thermal management system 22. In various embodiments, such systems for storing energy may be disposed completely or partially within external pod 20 or elsewhere within or on aircraft 10.

During operation, one or more devices 54 are powered by electrical power and thermal management system 22, and one or more heat sources, such as heat sources 46, 48 and 50 are cooled by electrical power and thermal management system 22.

Figure 4:
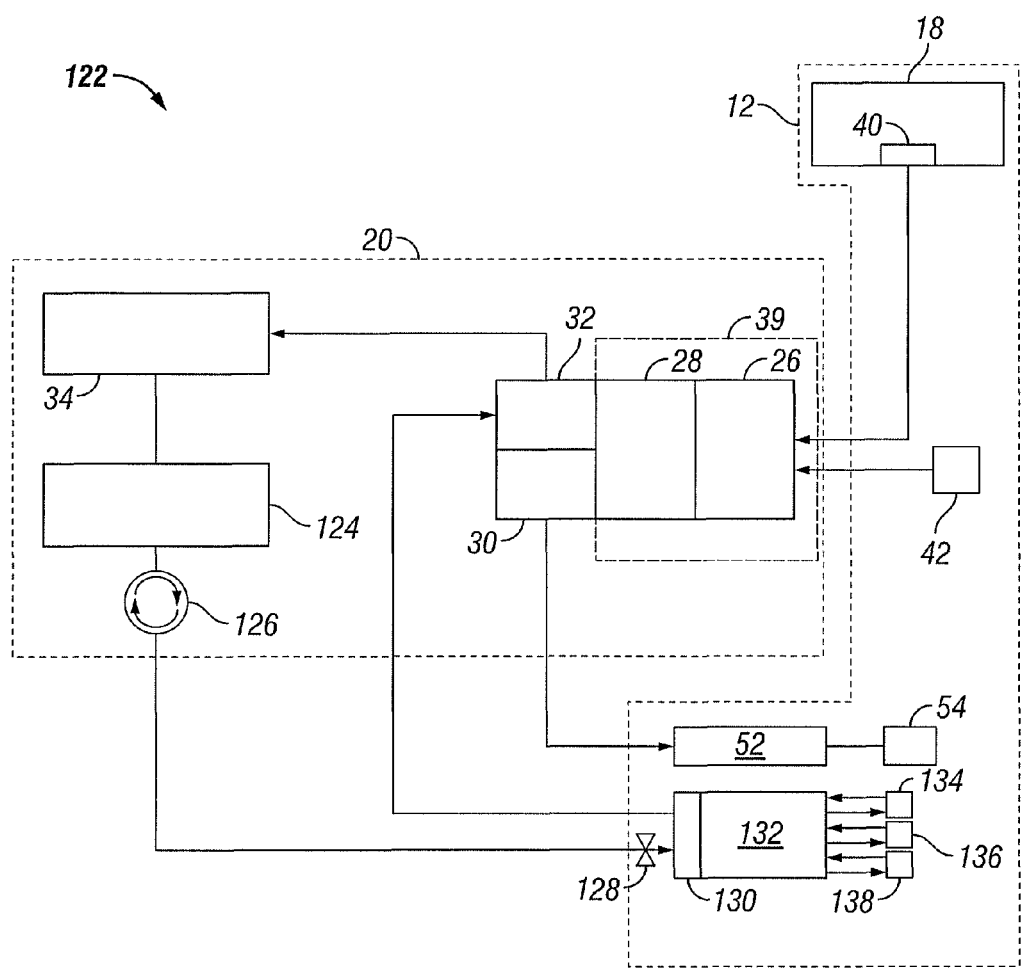
FIG. 4 schematically illustrates a non-limiting example of some aspects of an electrical power and thermal management system in accordance with an embodiment of the present invention.

Referring to FIG. 4, a non-limiting example of some aspects of an electrical power and thermal management system 122 in accordance with an embodiment of the present invention is schematically depicted. Electrical power and thermal management system 122 employs many of the same components for the same operations as set forth above with respect to electrical power and thermal management system 22, and hence, the description of such components, interconnections and operations is also applicable to electrical power and thermal management system 122.

In addition to combustor 26, turbine 28, generator 30, refrigerant compressor 32 and condenser 34, electrical power and thermal management system 122 includes a refrigerant receiver 124, a refrigerant circulation pump 126, an expansion valve 128, an evaporator 130 and a thermal energy storage (TES) system 132. TES 132 may be any type of system configured to store thermal energy, e.g., using one or more gases, liquids, solids and/or eutectic mixtures. Refrigerant receiver 124 is in fluid communication with the outlet of condenser 34, and is operative to receive liquid refrigerant from condenser 34. Recirculation pump 126 is in fluid communication with the outlet of refrigerant receiver 124 and the inlet of expansion valve 128. The outlet of expansion valve 128 is in fluid communication with the fluid inlet of evaporator 130. The vapor outlet of evaporator is in fluid communication with the inlet of refrigerant compressor 32.

Recirculation pump 126 is configured to pump liquid refrigerant to expansion valve 128. Expansion valve 128 is configured to expand the liquid refrigerant. In other embodiments, other means may be employed in addition to or in place of expansion valve 128 to expand the liquid refrigerant received from condenser 34. Evaporator 130 is configured to remove heat from TES 132. TES 132 is configured to remove heat from a plurality of heat sources 134, 136 and 138, which may be, for example and without limitation, system 24 components, such as a high power microwave module, a modulator and an antenna module. In other embodiments, other components of aircraft systems, weapon systems, propulsion systems and system 122 may be cooled by evaporator 130 and TES 132, in addition to or in place of those heat sources mentioned herein. It will be understood that an electrical power and thermal management system 122 may be mounted in each external pod 20, and that the output of both may be combined in order to meet electrical power and thermal management demands of aircraft 10 and/or any weapon system installed therein and/or mounted thereon, such as system 24.

Figure 5:
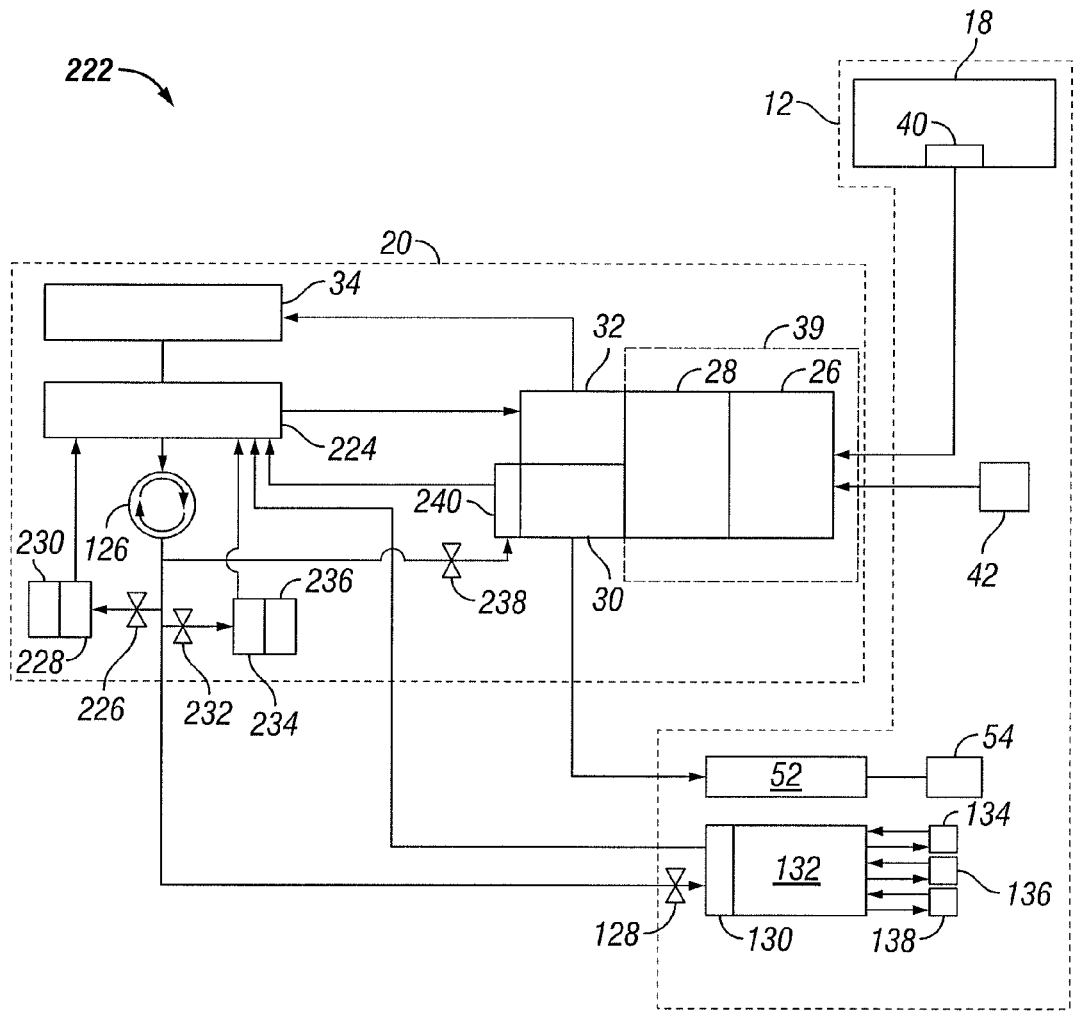
FIG. 5 schematically illustrates a non-limiting example of some aspects of an electrical power and thermal management system in accordance with an embodiment of the present invention.

Referring to FIG. 5, a non-limiting example of some aspects of an electrical power and thermal management system 222 in accordance with an embodiment of the present invention is schematically depicted. Electrical power and thermal management system 222 employs many of the same components for the same operations as set forth above with respect to electrical power and thermal management systems 22 and 122, and hence, the description of such components, interconnections and operations is also applicable to electrical power and thermal management system 222.

In addition to combustor 26, turbine 28, generator 30, refrigerant compressor 32, condenser 34, refrigerant circulation pump 126, expansion valve 128, evaporator 130 and TES 132, electrical power and thermal management system 222 includes a refrigerant receiver 224, an expansion valve 226, an evaporator 228, a heat exchanger 230, an expansion valve 232, an evaporator 234, a controller/rectifier 236 for generator 30, an expansion valve 238 and an evaporator 240. Refrigerant receiver 224 is configured to separate liquid refrigerant and refrigerant vapor, to return refrigerant vapor to the inlet of refrigerant compressor 32, and to supply liquid refrigerant to recirculation pump 126. Recirculation pump 126 is operative to circulate liquid refrigerant to the expansion valve and evaporator associated with each item to be cooled. For example, expansion valve 226 is in fluid communication with recirculation pump 126 and operative to receive liquid refrigerant from recirculation pump 126. Evaporator 228 is in fluid communication with expansion valve 226 for receiving liquid refrigerant therefrom, and is in fluid communication with refrigerant receiver 224 for supplying refrigerant vapor thereto. Recirculation pump 126 supplies liquid refrigerant to expansion valve 226, which is expanded and supplied to evaporator 228 for extracting heat from heat exchanger 230. In one form, heat exchanger 230 is a turbine 28 lube oil cooler, from which heat is extracted by evaporator 228. In other embodiments, heat exchanger 230 may be employed for cooling one or more other mediums and/or components in addition to or in place of turbine 28 lube oil. The refrigerant vapor exiting evaporator 228 is returned to refrigerant receiver 224, from where it is supplied to the inlet of refrigerant compressor 32.

Recirculation pump 126 also supplies liquid refrigerant to expansion valve 232, which is expanded and supplied to evaporator 234 for extracting heat from controller/rectifier 236. In other embodiments, evaporator 234 may be employed for cooling one or more other components in addition to or in place of controller/rectifier 236. The refrigerant vapor exiting evaporator 234 is returned to refrigerant receiver 224, from where it is supplied to the inlet of refrigerant compressor 32.

Recirculation pump 126 also supplies liquid refrigerant to expansion valve 238, which is expanded and supplied to evaporator 240 for extracting heat from generator 30. In other embodiments, evaporator 240 may be employed for cooling one or more other components in addition to or in place of generator 30. The refrigerant vapor exiting evaporator 240 is returned to refrigerant receiver 224, from where it is supplied to the inlet of refrigerant compressor 32.

Recirculation pump 126 also supplies liquid refrigerant to expansion valve 128, which is expanded and supplied to evaporator 130 for extracting heat from TES 132 for providing cooling of heat sources 134, 136 and 138. In other embodiments, evaporator 130 may be employed for cooling one or more other components in addition to or in place of heat sources 134, 136 and 138. The refrigerant vapor exiting evaporator 130 is returned to refrigerant receiver 224, from where it is supplied to the inlet of refrigerant compressor 32.

Embodiments of the present invention include an airborne electrical power and thermal management system, comprising: a turbine in fluid communication with a gas turbine engine bleed air source; a generator powered by the turbine and configured to provide power to an electrical load; a refrigerant compressor powered by the turbine; a condenser in fluid communication with the refrigerant compressor; and at least one evaporator in fluid communication with the condenser, wherein the at least one evaporator is configured to extract heat from at least one heat source.

In a refinement, the electrical load includes a directed energy weapon system.

In another refinement, the at least one heat source includes a directed energy weapon system.

In yet another refinement, the system further comprises a combustor fluidly disposed between the turbine and the bleed air source, wherein the combustor is operative to mix fuel with air received from the bleed air source, combust the mixture, and discharge the combustion products to the turbine.

In still another refinement, the at least one heat source is a plurality of heat sources, further comprising a chilled fluid manifold, wherein the at least one evaporator is configured to chill a fluid for delivery to the chilled fluid manifold; and wherein the chilled fluid manifold is configured to distribute chilled fluid to the plurality of heat sources.

In yet still another refinement, the turbine, the generator, the refrigerant compressor and the condenser are disposed in an aircraft external pod.

In an additional refinement, the system further comprises a gas turbine engine disposed within the external pod, wherein the turbine is a component of the gas turbine engine.

In a further refinement, the system further comprises a refrigerant receiver; a thermal energy storage system; and an evaporator in fluid communication with the refrigerant receiver and operative to receive a liquid refrigerant from the refrigerant receiver and extract heat from the thermal energy storage system.

In a yet further refinement, the system further comprises a refrigerant circulation pump configured to pump the liquid refrigerant to the thermal energy storage system.

Embodiments of the present invention include an aircraft, comprising: a fuselage; a wing coupled to the fuselage; an empennage coupled to at least one of the fuselage and the wing; a gas turbine engine propulsion system coupled to the aircraft and having a bleed air port; an external pod coupled to the aircraft; and an electrical power and thermal management system at least partially disposed in the external pod, wherein the electrical power and thermal management system includes a turbine in fluid communication with the bleed air port; a generator powered by the turbine and configured to provide power to an aircraft electrical load; a refrigerant compressor powered by the turbine; a condenser in fluid communication with the refrigerant compressor; and at least one evaporator in fluid communication with the condenser, wherein the at least one evaporator is configured to extract heat from at least one heat source.

In a refinement, the at least one heat source includes components of a directed energy weapon system.

In another refinement, at least the turbine, the generator and the refrigerant compressor are disposed in the external pod.

In yet another refinement, the condenser is disposed in the external pod.

In still another refinement, the condenser is configured for cooling with ambient air supplied to the condenser from outside the external pod.

In yet still another refinement, the condenser is configured for ram-air cooling.

In an additional refinement, the aircraft further comprises a combustor fluidly disposed between the turbine and the bleed air port, wherein the combustor is operative to mix fuel with air received from the bleed air port, combust the mixture, and discharge the combustion products to the turbine.

In a further refinement, the at least one heat source is a plurality of heat sources; wherein the at least one evaporator is a plurality of evaporators corresponding in number to the plurality of heat sources; and wherein each evaporator of the plurality of evaporators is configured to extract heat from a corresponding each heat source of the plurality of heat sources.

In a yet further refinement, the aircraft further comprises a refrigerant circulation pump configured to pump liquid refrigerant to the plurality of evaporators.

In a still further refinement, the aircraft further comprises a refrigerant receiver fluidly disposed between the condenser and the refrigerant circulation pump, wherein the refrigerant receiver is configured to accumulate liquid refrigerant.

In a yet still further refinement, the refrigerant receiver is configured to separate liquid refrigerant from refrigerant vapor.

In an additional refinement, the system further comprises a gas turbine engine disposed within the external pod, wherein the turbine is a component of the gas turbine engine.

Embodiments of the present invention include an aircraft, comprising: a fuselage; a wing coupled to the fuselage; an empennage coupled to at least one of the fuselage and the wing; a gas turbine engine propulsion system having a bleed air port; and means for providing electrical power and thermal management, wherein the means for providing is in fluid communication with the bleed air port.

In a refinement, the aircraft further comprises an external pod, wherein the means for providing is at least partially disposed in the external pod.

In another refinement, the external pod is configured to appear similar to a conventional external fuel tank pod employed by the aircraft.

Embodiments of the present invention include an aircraft, comprising: a fuselage; a wing coupled to the fuselage; an empennage coupled to at least one of the fuselage and the wing; a gas turbine engine propulsion system coupled to the aircraft for providing propulsive thrust to the aircraft; an external pod coupled to the aircraft; and an electrical power and thermal management system at least partially disposed in the external pod, wherein the electrical power and thermal management system includes a gas turbine engine disposed in the external pod; a generator powered by the gas turbine engine and configured to provide power to an aircraft electrical load; a refrigerant compressor powered by the gas turbine engine; a condenser in fluid communication with the refrigerant compressor; and at least one evaporator in fluid communication with the condenser, wherein the at least one evaporator is configured to extract heat from at least one heat source.

In a refinement, the external pod is configured to appear similar to a conventional external fuel tank pod employed by the aircraft.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An airborne electrical power and thermal management system, comprising:
   a first gas turbine engine having a first combustor, a first turbine and a bleed air port, the first gas turbine engine operable for producing propulsive power for an aircraft;
   a second gas turbine engine including:
      a second combustor in fluid communication with the first gas turbine engine bleed air port; and
      a second turbine in fluid communication with the second combustor;
   a generator powered by the second turbine and configured to provide electrical power to an electrical load;
   a refrigerant compressor powered by the second turbine;
   a condenser in fluid communication with the refrigerant compressor; and
   at least one evaporator in fluid communication with the condenser, wherein the at least one evaporator is configured to extract heat from at least one heat source;
   wherein the second gas turbine engine, the generator, the refrigerant compressor and the condenser are disposed in an aircraft external pod;
   wherein the at least one evaporator is disposed in the aircraft external pod or an aircraft fuselage.

2. The system of claim 1, wherein the electrical load includes a directed energy weapon system.

3. The system of claim 1, wherein the at least one heat source includes a directed energy weapon system.

4. The system of claim 1, wherein the second combustor is operative to mix fuel with air received from the bleed air port, combust the mixture, and discharge the combustion products to the second turbine.

5. The system of claim 1, wherein the at least one heat source is a plurality of heat sources, further comprising a chilled fluid manifold, wherein the at least one evaporator is configured to chill a fluid for delivery to the chilled fluid manifold; and wherein the chilled fluid manifold is configured to distribute chilled fluid to the plurality of heat sources.

6. The system of claim 1, further comprising a refrigerant receiver; a thermal energy storage system; and an evaporator in fluid communication with the refrigerant receiver and operative to receive a liquid refrigerant from the refrigerant receiver and extract heat from the thermal energy storage system.

7. The system of claim 6, further comprising a refrigerant circulation pump configured to pump the liquid refrigerant to the thermal energy storage system.

8. An aircraft, comprising:
   a fuselage;
   a wing coupled to the fuselage;
   an empennage coupled to at least one of the fuselage and the wing;
   a first gas turbine engine propulsion system having a first combustor and a first turbine coupled to the aircraft and having a bleed air port;
   an external pod coupled to the aircraft; and
   an electrical power and thermal management system including
      a second gas turbine engine comprising:
         second combustor in fluid communication with the bleed air port; and
         a second turbine in fluid communication with the second combustor;
      a generator powered by the second turbine and configured to provide electrical power to an aircraft electrical load;
      a refrigerant compressor powered by the second turbine;
      a condenser in fluid communication with the refrigerant compressor; and
      at least one evaporator in fluid communication with the condenser, wherein the at least one evaporator is configured to extract heat from at least one heat source
   wherein the second gas turbine engine, the generator, the refrigerant compressor and the condenser are disposed in the external pod;
   wherein the at least one evaporator is disposed in the external pod or the fuselage.

9. The aircraft of claim 8, wherein the at least one heat source includes components of a directed energy weapon system.

10. The aircraft of claim 8, wherein the condenser is configured for cooling with ambient air supplied to the condenser from outside the external pod.

11. The aircraft of claim 10, wherein the condenser is configured for ram-air cooling.

12. The aircraft of claim 8, wherein the second combustor is operative to mix fuel with air received from the bleed air port, combust the mixture, and discharge the combustion products to the second turbine.

13. The aircraft of claim 8, wherein the at least one heat source is a plurality of heat sources; wherein the at least one evaporator is a plurality of evaporators corresponding in number to the plurality of heat sources; and wherein each evaporator of the plurality of evaporators is configured to extract heat from a corresponding each heat source of the plurality of heat sources.

14. The aircraft of claim 13, further comprising a refrigerant circulation pump configured to pump liquid refrigerant to the plurality of evaporators.

15. The aircraft of claim 14, further comprising a refrigerant receiver fluidly disposed between the condenser and the refrigerant circulation pump, wherein the refrigerant receiver is configured to accumulate liquid refrigerant.

16. The aircraft of claim 15, wherein the refrigerant receiver is configured to separate liquid refrigerant from refrigerant vapor.

17. An aircraft, comprising:
   a fuselage;
   a wing coupled to the fuselage;
   an empennage coupled to at least one of the fuselage and the wing;
   a fuel tank;
   a first gas turbine engine propulsion system having a bleed air port and a first combustor to provide energy for aircraft propulsion;
   an electrical power and thermal management system including a second gas turbine engine, at least one evaporator, a refrigerant compressor, and a condenser,
   wherein the second gas turbine engine has a second combustor to provide energy for electrical power and thermal management, and wherein the second combustor is in fluid communication with the bleed air port of the first gas turbine engine and the fuel tank; and
   an external pod, wherein the second gas turbine engine, the refrigerant compressor, and the condenser of the electrical power and thermal management system are disposed in the external pod;
   wherein the at least one evaporator is disposed in the external pod or the fuselage.

18. The aircraft of claim 17, wherein the external pod is configured to appear similar to a conventional external fuel tank pod employed by the aircraft.

19. An aircraft, comprising:
a fuselage;
a wing coupled to the fuselage;
an empennage coupled to at least one of the fuselage and the wing;
a first gas turbine engine propulsion system having a first combustor and a first turbine coupled to the aircraft for providing propulsive thrust to the aircraft;
an external pod coupled to the aircraft; and
an electrical power and thermal management system including
a second gas turbine engine having
a second combustor and
a second turbine;
a generator powered by the second gas turbine engine and configured to provide electrical power to an aircraft electrical load;
a refrigerant compressor powered by the second gas turbine engine;
a condenser in fluid communication with the refrigerant compressor; and
at least one evaporator in fluid communication with the condenser, wherein the at least one evaporator is configured to extract heat from at least one heat source
wherein the second gas turbine engine, the generator, the refrigerant compressor and the condenser are disposed in the external pod;
wherein the at least one evaporator is disposed in either the external pod or the fuselage
wherein the aircraft electrical load and the at least one heat source are disposed in the fuselage.

20. The aircraft of claim 19, wherein the external pod is configured to appear similar to a conventional external fuel tank pod employed by the aircraft.

* * * * *